United States Patent [19]

Eckersley

[11] Patent Number: 5,402,054

[45] Date of Patent: Mar. 28, 1995

[54] VARIABLE SPEED AC DRIVE CONTROL

[75] Inventor: Gregory P. Eckersley, Melbourne, Australia

[73] Assignee: Boral Johns Perry Industries Pty. Ltd., Cheltenham, Australia

[21] Appl. No.: 106,787

[22] Filed: Aug. 16, 1993

Related U.S. Application Data

[63] Continuation of Ser. No. 838,251, Apr. 22, 1992, abandoned.

[30] Foreign Application Priority Data

Sep. 11, 1989 [AU] Australia .................. PJ6281

[51] Int. Cl.⁶ ............................................. H02P 5/28
[52] U.S. Cl. .................................. 318/801; 318/807; 363/160; 363/165
[58] Field of Search ............... 318/721, 723, 773, 803, 318/772, 768, 807, 778, 722, 783, 616, 618, 801, 808, 809, 571, 587, 443; 323/216; 363/160, 10, 165, 9, 161, 162, 157

[56] References Cited

U.S. PATENT DOCUMENTS

| | | | |
|---|---|---|---|
| 3,612,916 | 10/1971 | O'Neill | 323/217 |
| 3,659,168 | 4/1972 | Salihi et al. | 318/803 |
| 4,041,360 | 8/1977 | Morris | 318/782 |
| 4,321,517 | 3/1982 | Touchton et al. | 318/616 |
| 4,486,698 | 12/1984 | Blümner | 318/721 |
| 4,516,178 | 5/1985 | Lee | 318/616 |
| 4,569,013 | 2/1986 | Kishi et al. | 318/571 |
| 4,626,762 | 12/1986 | Fujioka et al. | 318/809 |
| 4,633,382 | 12/1986 | Upadhyay et al. | 318/778 |
| 4,665,487 | 5/1987 | Ogawa et al. | 318/587 |
| 4,713,744 | 12/1987 | Coston | 318/768 |
| 4,797,601 | 1/1989 | Ditzer et al. | 318/443 |

FOREIGN PATENT DOCUMENTS

| | | |
|---|---|---|
| 0081723 | 11/1982 | European Pat. Off. . |
| 3040105 | 5/1982 | Germany . |

*Primary Examiner*—William M. Shoop, Jr.
*Assistant Examiner*—John W. Cabeca

[57] ABSTRACT

A method for controlling the speed of an AC machine (12) is described.

The AC machine (12) receives three output phases (A,B,C) supplied from a cycloconverter (10) which is connected to an input supply (R,Y,B) of frequency $f_1$. The cycloconverter (10) is caused to operate in three modes under control of a microprocessor (25).

The first mode supplies the AC machine (12) in the frequency range 0 to $f_0$, by conventional cycloconverting to generate a near continuum of frequencies.

The second mode operates the cycloconverter (10) to synthesize a number of frequency steps in the frequency range $f_0$ to $f_1$ from the input supply (R,Y,B) and provides speed control of the AC machine (12) by phase control of the output voltage (A,B,C) between each frequency step.

The third mode operates the cyclonverter (10) to be transparent, such that the input frequency $f_1$ is effectively directly supplied to the AC machine (12) without speed regulation being applied.

13 Claims, 7 Drawing Sheets

VARIABLE SPEED AC DRIVE CONTROL

This application is a continuation of application Ser. No.: 07/838,251, filed on Apr. 22, 1992, now abandoned.

TECHNICAL FIELD

This invention relates to variable speed AC drive systems, and particularly, but not exclusively, to a method for controlling the speed of such systems.

BACKGROUND OF THE INVENTION

There are many well known variable speed drive systems for AC machines commonly in use.

Controllers for these systems consist of two basic types, that being either line commutated or force commutated.

Force commutated type controllers include (transistorised or GTO) adjustable voltage or current inverters, or pulse width modulation inverters. In all cases, there is a requirement that the available mains frequency be DC converted by a rectifier circuit, then inverted to the required AC frequency for provision to the AC machine. A characteristic of such controllers is the expense associated with the extra elements in the DC conversion process, including the necessary energy storage facility in the DC link.

Line commutated controllers, which utilise SCR technology, rely on a zero crossing of the line current in any phase, together with the impression of a reverse bias voltage between the anode and cathode of the respective SCR, and are commonly provided by means of a rectifier/inverter combination (this requiring provision of a DC link), or through a direct AC/AC converter such as a cycloconverter.

A characteristic function of a cycloconverter is that it produces an output frequency of some submultiple of the supplied input frequency (typically the mains frequency).

Cycloconverters are limited by an upper frequency bound, which is a function of the number of SCRs provided and their configuration. For a three-phase, three-pulse cycloconverter having a 50 Hz mains input frequency, the maximum output frequency to be generated will be approximately 20 Hz. The upper bound of output frequency from a cycloconverter results from an increase in harmonic components in the generated waveform, which will cause a dramatic reduction in the quality of that waveform and thereby increase the degree of heating within the AC machine due to losses. A further consequence of the deterioration of the output waveform is that unacceptable torque pulsations may occur within the AC machine.

All the foregoing control systems can provide variable speed control of an AC machine within a defined range. However, those systems which provide for speed control over the range of 0 to mains frequency tend to be particularly expensive. Accordingly, there is a need to provide a variable speed AC control system which is relatively inexpensive and can provide speed control over the full range.

The present invention attempts to alleviate some of the problems associated with the known systems by providing a system which is relatively simple in design and can be operated by a method which provides speed control over a full range.

DISCLOSURE OF THE INVENTION

Therefore in accordance with one aspect of the invention there is provided a method of controlling the speed of an AC rotating machine, the AC machine being connected to a frequency converter which in turn is connected to an input power supply, the method comprising:

operating the AC machine in three exclusive speed ranges within the range 0 to the frequency of the input supply, $f_1$, wherein each of the three speed ranges corresponds to a separate operating mode of the frequency converter, and (i) in the first mode, the frequency converter operates to synthesize a near continuum of frequencies in the range 0 to $f_0$, where $f_0$ is less than $f_1$, (ii) in the second mode, the frequency converter operates by synthesizing a number of output waveforms of intermediate frequency steps between the frequencies $f_0$ to $f_1$, and between each frequency step the machine is controlled by phase control of the input supply to obtain voltage control over the AC machine, and (iii) in the third mode, the frequency converter operates to be effectively transparent to the input supply, whereby the AC machine receives the input supply frequency $f_1$.

In accordance with a further aspect of the invention there is provided a method of operating an AC-AC frequency converter connected to an input power supply with frequency, $f_1$, comprising operating the frequency converter in any one of three exclusive modes, wherein:

(i) the first mode is effected for the frequency range 0 to $f_0$, where $f_0$ is less than $f_1$ and in which the frequency controller operates to synthesize a near continuum of frequencies in the said range, (ii) the second mode is effected by synthesizing a number of output waveforms of intermediate frequency steps between the frequencies $f_0$ to $f_1$, and between each frequency step further control is provided by phase control of the input supply to obtain control over the output voltage from the frequency converter, and (iii) in the third mode the frequency controller is effectively transparent to the input supply and provides an output at at the input supply frequency, $f_1$.

In accordance with a further aspect of the invention, there is provided a variable speed controller for an AC machine, comprising a frequency convertor suitable for connection to an input power supply and for generating an output which would be provided to the AC machine, the frequency convertor having power switching means which is controllable under a program residing in processor means to operate the frequency convertor in three exclusive speed ranges within the range 0 to the frequency of the input supply, $f_1$, wherein (i) the first mode is effected for the frequency range 0 to $f_0$, where $f_0$ is less than $f_1$ and in which the frequency controller operates to synthesize a near continuum of frequencies in the said range, (ii) the second mode is effected by synthesizing a number of output waveforms of intermediate frequency steps between the frequencies $f_0$ to $f_1$, and between each frequency step further control is provided by phase control of the input supply to obtain control over the output voltage from the frequency converter, and (iii) in the third mode the frequency controller is effectively transparent to the input supply and provides an output at the input supply frequency, $f_1$.

BRIEF DESCRIPTION OF THE DRAWINGS

In order that the invention can be more clearly understood, an example of a preferred embodiment will now be described with reference to the accompanying drawings, wherein.

DESCRIPTION OF PREFERRED EMBODIMENTS

It is useful to describe an embodiment of the present invention with reference to a particular application, that being a variable speed AC drive system in a lift installation, in which there is a three-phase induction machine coupled to the necessary mechanical equipment for raising and lowering of a lift car.

The power supply to each phase of the three-phase induction machine is provided by a conventional cycloconverter, which in turn is connected to the mains supply. In this example, the mains frequency is nominally 50 Hz.

Accordingly, the full range of operation for the induction machine will be 0 Hz to 50 Hz. The full speed of 50 Hz corresponds to an angular rotational frequency impressed on the stator of the induction machine of 100 $\pi$ radians per second.

It is to be understood the applicability of the present invention is not limited to the embodiment described. The invention may be equally applicable to embodiments where the AC machine consists of a synchronous machine, and also where the AC machine can be of other phase number, including single phase.

The three-phase induction machine of the present embodiment is conventiently a non slip-ring rotor type, which is more commonly known as a squirrel cage induction machine. In another example, the induction machine could be a wound rotor type, this providing adjustment of the rotor resistance, which has a particular relevance in respect of the torque speed characteristic of the induction machine.

Figure 1:
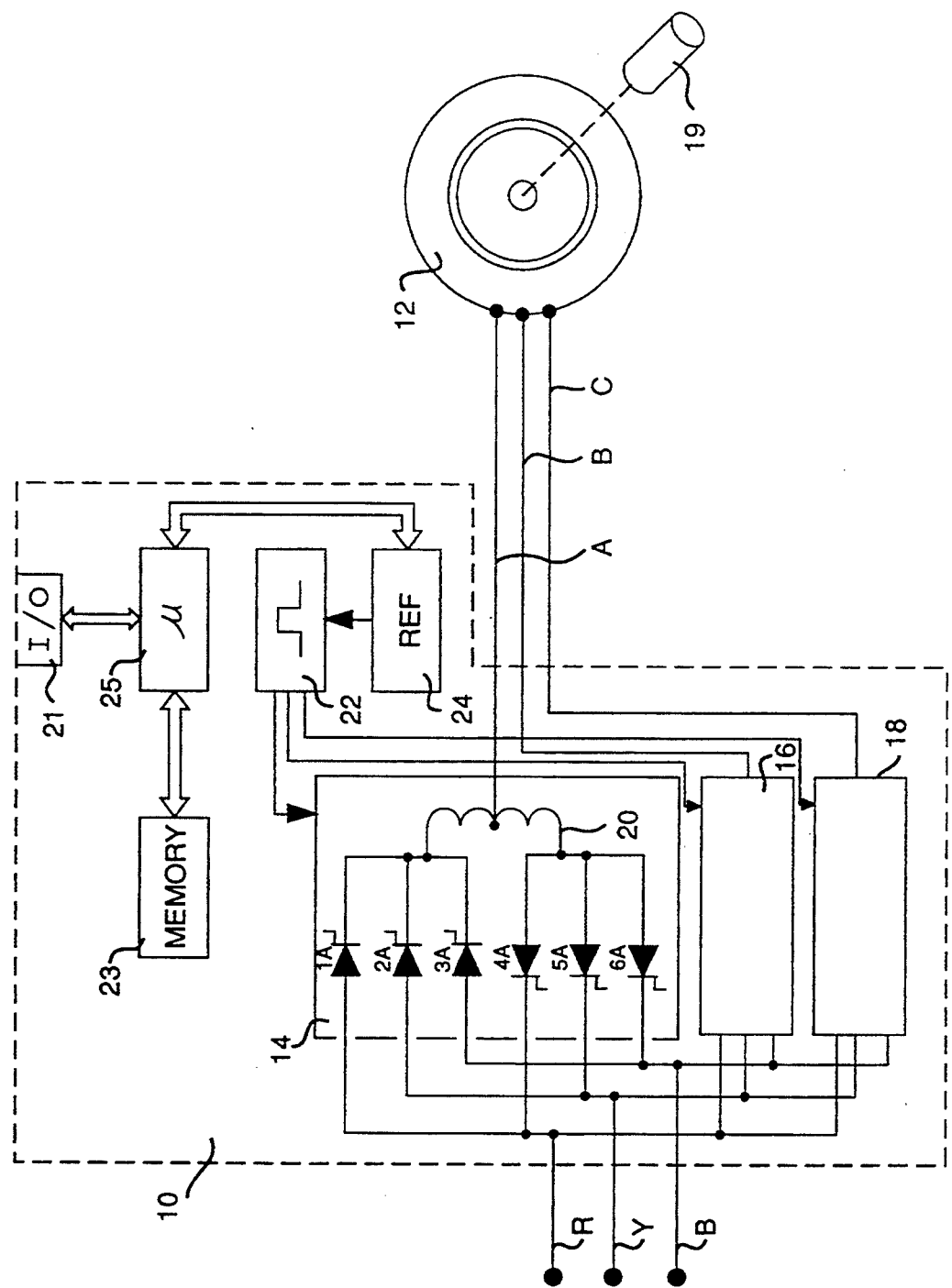
FIG. 1 is an illustration of the power and control circuitry for a mains-connected cycloconverter with an induction machine connected thereto.

FIG. 1 shows the present embodiment, that being the provision of three-phase input supply (R, Y, B) having a nominal frequency of $f_1 = 50$ Hz, a cycloconverter 10, three-phase output phases (labelled as A, B and C respectively) from the cycloconverter 10, which provide an operational frequency, $f_2$, to a three-phase squirrel cage induction machine 12.

In the cycloconverter 10, the three single-phase power circuits 14 (phase A), 16 (phase B) and 18 (phase C) are shown. Each of the power circuits 14,16,18 performs the generation of the respective output phase for connection with the induction machine 12 by suitable switching of its constituent SCR devices. In the example shown, the configuration of only one of the power circuits is shown in complete detail. Power circuit 14 consists of a double three-leg SCR bridge, with each of the three SCRs in the half bridges being connected to each of the input phases R,Y,B. The outputs of the half bridges are connected via a centre tapped inductor 20, which assists in the line commutation process.

The SCRs in phase A circuit 14 are conveniently labelled 1A–6A. SCRs 1A–3A generate the upper half cycle of the output waveform for the A phase, while SCRs 4A–6A generate the lower half cycle.

Power circuit 16 and power circuit 18 are duplications of power circuit 14. Therefore, a total of eighteen SCRs are required in the cycloconverter 10.

Associated with the power circuits 14,16,18 is the firing electronics 22 and the reference generating electronics 24.

The reference generating electronics 24 provides the correct timing for the gate control pulses generated by the firing electronics 22 and provided to each of the gate electrodes of SCRs 1A–6A.

By particular manipulation of the firing angle for each SCR, the three input phases R, Y, B can be arranged to produce a quasi-sinusoidal output phase waveform. The timing of the firing pulses between the respective phase power circuits 14–18 are displaced by 120° with respect to each other to obtain correct phase spacing.

The angular displacement between the three output phase waveforms can be chosen to provide a phase rotation to achieve the desired direction of rotation of the induction motor 12. The reference generating electronics 24 is under the control of a microprocessor 25. The microprocessor 25 is responsible for monitoring and affecting the speed control strategy as presently will be described.

Associated with the microprocessor 25 is a memory 23 which contains routines which can be called by the microprocessor 25, and also an I/O interface 21 for communication with a supervising system or external components.

One such external component is the digital tachometer 19 which provides a measure of the actual speed of the AC machine 12 to the microprocessor 25 for use in the speed control strategy. The digital tachometer 19 could also be replaced by an optical speed sensing device.

A typical supervising system may be a central controller having overall control over a whole lift installation, and would receive the various servicing calls placed by passengers in the lifts, to determine the distance to be travelled and speed profile for any lift car, which information is necessary for the microprocessor 25 to implement the speed control strategy.

Figure 2:
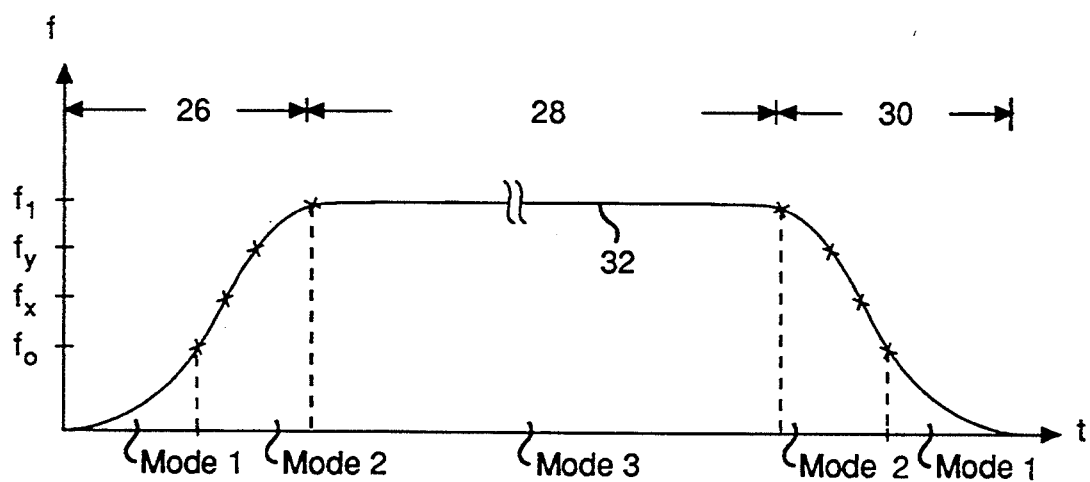
FIG. 2 is a plot of a typical speed profile as a function of time for operation of the induction machine.

FIG. 2 shows an idealized plot of velocity (as frequency) versus time for a lift car travelling from a stopped position at one floor to a stopped position at a destination floor. This characteristic can be generally identified as an acceleration period 26, a constant velocity period 28 and a deceleration period 30. The idealized target velocity profile is represented as curve 32.

The curve 32 is shown divided into three modes of operation. Mode 1 operates between the frequencies 0 to $f_0$, mode 2 operates between the frequency $f_0$ to $f_1$ and mode 3 operates at the frequency $f_1$.

The use of frequency on the independent axis is a convenient measure of angular velocity, which represents that frequency $f_1$ corresponds to mains frequency, that being the highest angular speed, and in the present example representing an angular speed of 100 π radians per second.

It is important to note both mode 1 and mode 2 are utilized in the acceleration period 26 and the deceleration period 30. That is, the modes are independent of whether the lift car is accelerating away from a floor or decelerating into a floor.

A description of each of three modes as they relate to control of the variable speed AC drive controller will now be made with reference to the elements of FIG. 2.

Figure 3:
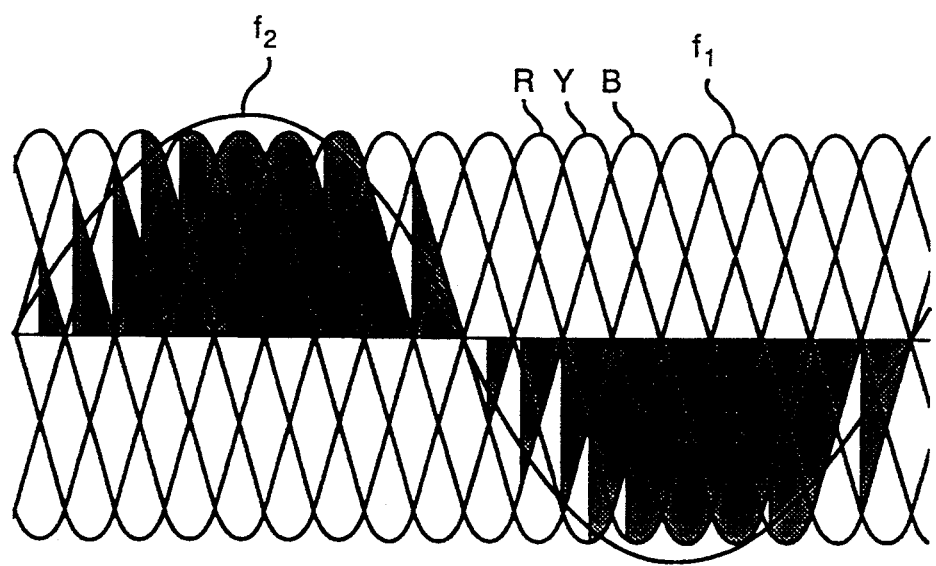
FIG. 3 shows a first mode of operation of an embodiment of a variable speed AC drive controller.

Mode 1 operates in a conventional cycloconverter mode with velocity feedback from the induction machine 12 as measured by the digital tachometer 19. FIG. 3 shows a single representative output phase from the cycloconverter 10, where the three-phase input waveforms are clearly identified as $f_1$, and the resultant generated quasi-sinusoidal output waveform is shown as $f_2$. Therefore, in the operation of the system in accordance with curve 32 of the idealized velocity profile, an increase in speed from 0 to $f_0$ along the curve 32 is firstly performed by conventional cycloconverter control. upper bound of frequency, $f_0$, represents the highest frequency in which satisfactory cycloconverter operation can be performed. As discussed previously, the proportion of harmonic content in the output waveform increases with output frequency up to a point where there is unacceptable heating of the induction machine, and torque pulsations make the operation of the lift system impractical, and indeed uncomfortable for the persons riding in the lift car.

Cyloconverter control is usually by means of selecting a near continuum of frequencies between 0 and $f_0$, to control the change in speed. Voltage control by phase retardation in the firing of the SCRs may be employed to control the voltage impressed on the stator, and to thereby manipulate the excitation of the machine 12, but is not usually used as an additional means of speed control over the frequency control.

Operation of the cycloconverter 10 in mode 2 will now be described with reference to FIGS. 4A-4F.

Once the speed of the induction machine corresponds with the output frequency $f_0$, mode 2 is entered. In a simplified form which will aid understanding, the timing of the gate pulses to the SCRs of the power circuits 14,16,18 is such as to generate an output waveforms from the resultant of the three-phase input waveforms as shown in FIGS. 4A-4F.

Figure 4A:
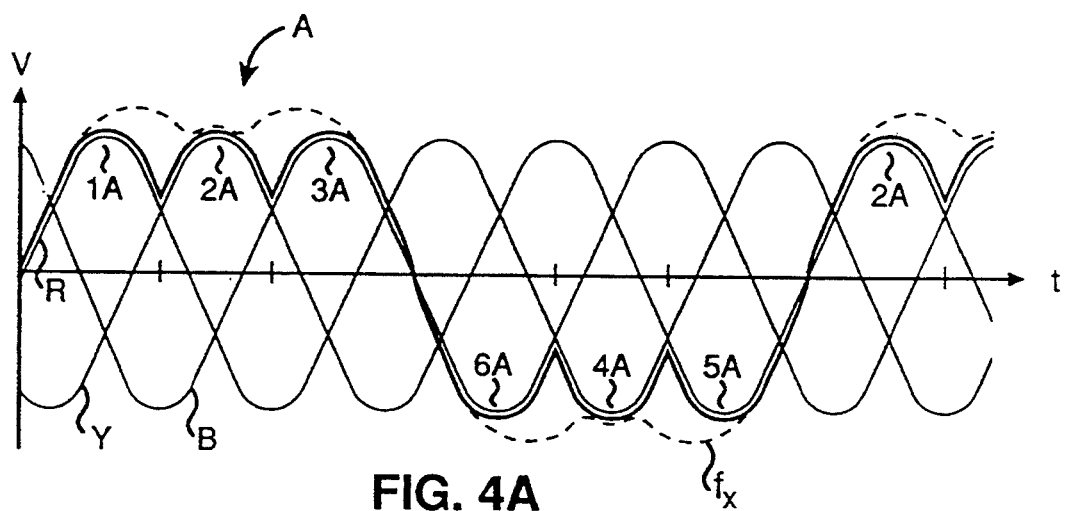
FIG. 4 shows a second mode of operate of the variable speed AC controller referred to in FIG. 3.
Figure 4B:
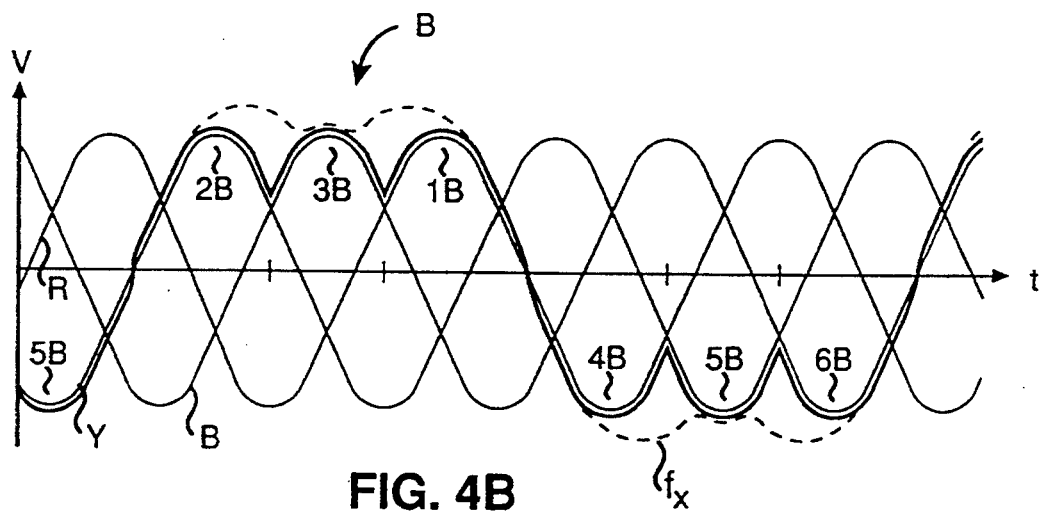
Figure 4C:
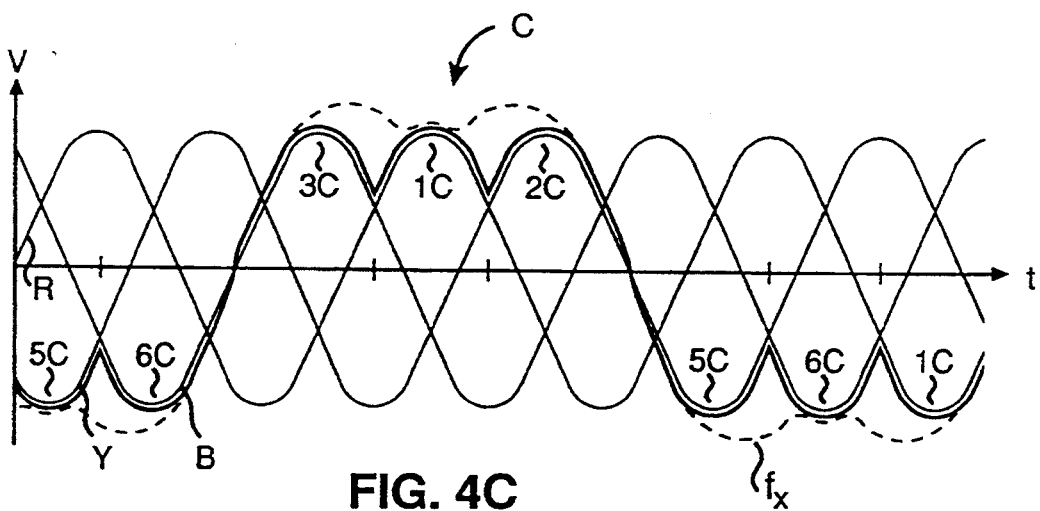

In the example shown, a two-step process in mode 2 is effected, whereby above frequency $f_0$ a first frequency $f_x$ is chosen, this corresponding to the fundamental frequency shown in FIGS. 4A-4C. This fundamental frequency for each phase output is determined by the resultant of a waveform generated from the three input phase lines (R, Y, B).

Referring to FIG. 4A, it is noted that injected partial cycles are added to the first half cycle of the relevant phase, thus providing the subsequent fundamental component of the output phase frequency.

As shown in FIGS. 4A-4C, the respective SCRs 1A-6A, 1B-6B, 1C-6C within the respective power circuits 14,16,18 of FIG. 2 for each output phase are shown marked when in a conducting state. The changeover between conduction states for the various SCRs in the double bridge of each power circuit per phase is shown on the time axis.

Once the induction machine 12 has reached the speed corresponding to frequency $f_x$, the control system implements the second step in mode 2 by synthesizing output phases having a frequency corresponding to $f_y$. The build up in speed between $f_x$ and $f_y$ is achieved by control of the stator voltage by phase control in the gating of the SCRs. The rotational speed of an induction machine is a function of stator voltage as well as a direct function of frequency.

Figure 4D:
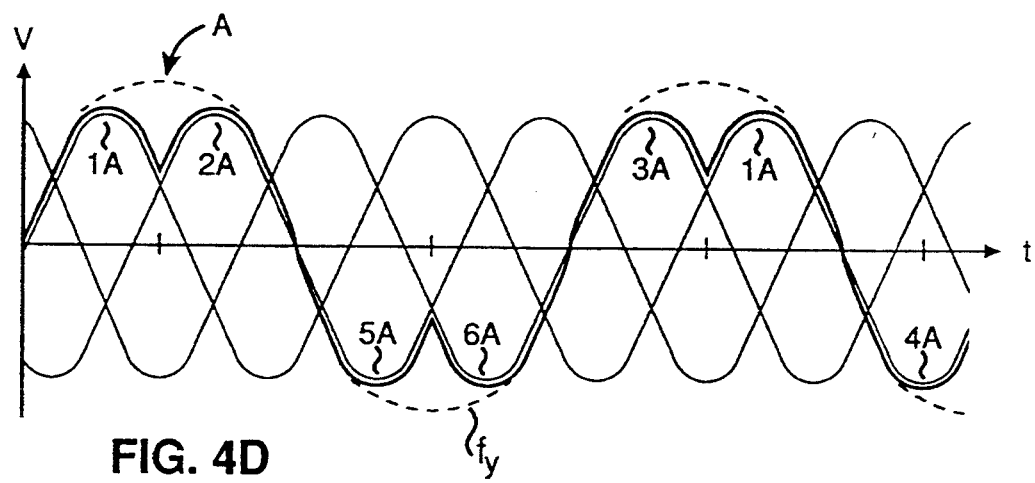
Figure 4E:
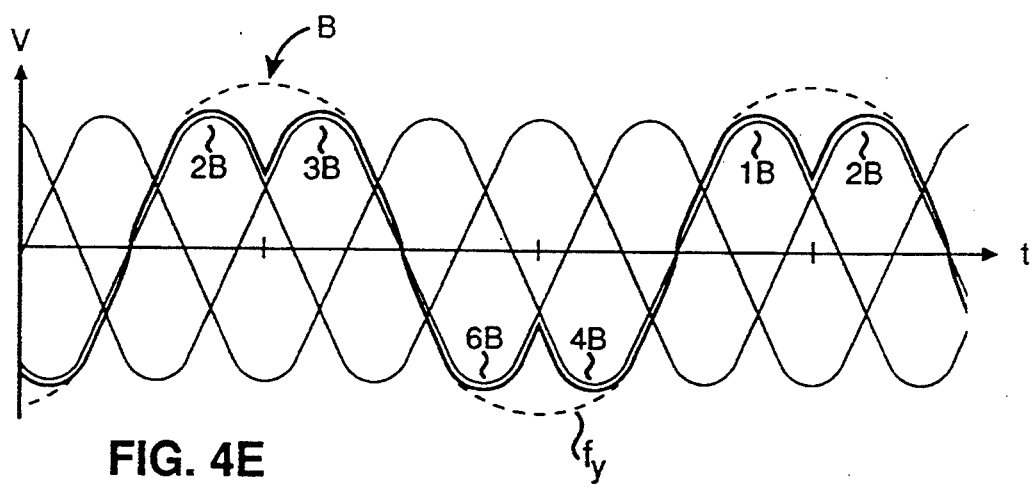
Figure 4F:
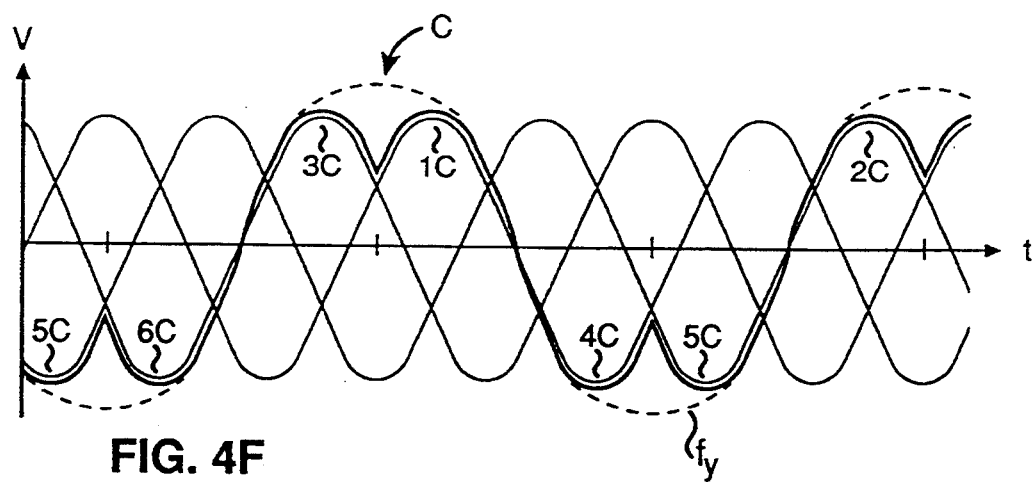

Referring to FIGS. 4D-4F, the output phase waveforms having fundamental component $f_y$ are synthesized by the inclusion of only one injected partial cycle.

An expression which can be used to calculate the fundamental frequency of each output phase waveform is as follows:

$$f_2 = (t_1 + 2t_1/3 \times 1)^{-1} \times 10^3$$

where $t_1$ = the period of the input mains frequency, and
m = the number of injected partial cycles.

In the first step, $t_1$, = 20 msec, and for FIGS. 4A-4C the number of injected cycles=2, therefore:

$$f_x = f_2 = (20 + 80/3)^{-1} \times 10^3$$

which is approximately = 22 Hz.

Using the formula for the second step, the output frequency is determined to be:

$$f_2 = (20 + 40/3)^{-1} \times 10^3 = 30 \text{ Hz}.$$

Once the induction motor 12 achieves the speed represented by frequency $f_y$ (i.e. the rotor slip decreases), the final frequency $f_1$ is then generated by adjustment of the reference generating electronics 24, and the speed increases by stator voltage control as before.

Certainly the operation of mode 2 is not this simple, as it is almost always the case the stator voltage is required to be less than the input supply voltage. FIG. 4 shows the stator voltage occassionally exceeding the input supply voltage. It is usual to employ a form a phase control in the firing of the SCRs to reduce the resultant stator voltage, as well as to control the speed changes between $f_0$, $f_x$, $f_y$ and $f_1$.

In addition, the generation of the resultant waveform may not be as simple as injecting the next one or more positive-going waveforms (in the case for the positive half cycle). FIG. 4 presented only two frequency steps between $f_0$ and $f_1$, but it is desireable that a greater number of steps be provided to provide a uniform acceleration or deceleration characteristic. FIG. 5 shows alternative strategies which can be adopted to synthesize the stator waveform. Only one phase is shown.

Figure 5A:
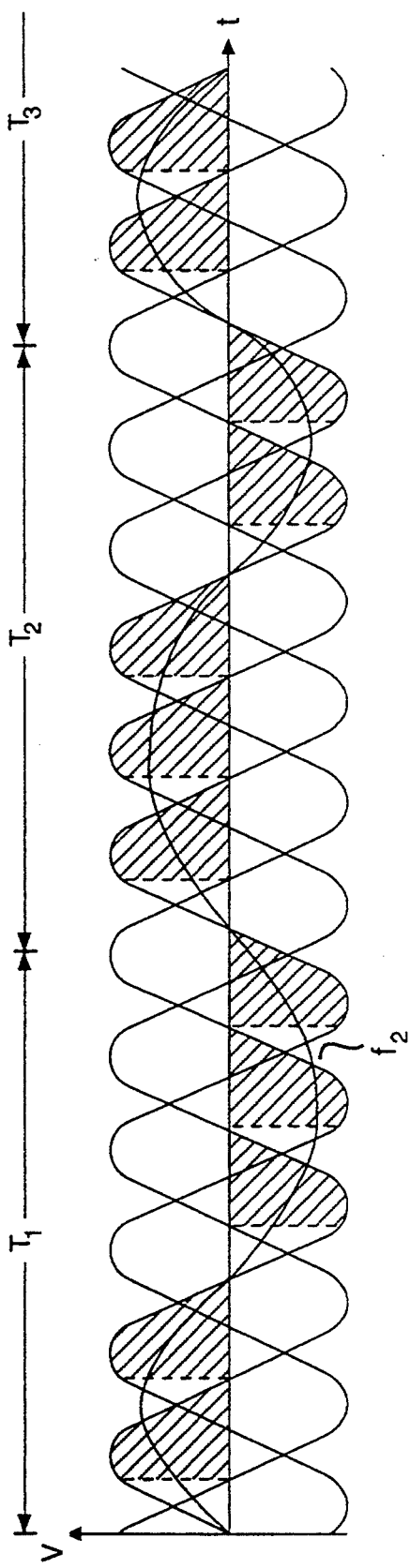
FIG. 5 shows an alternative strategy in the second mode of operation.

FIG. 5A illustrates the possibility of injecting different numbers of adjacent cycles to synthesize a pseudo-sinusoidal ouptut. The cycles are chosen in an alternating fashion to account for non-linearities. Two complete output cycles, $T_n$, are shown, which is the basic unit for the repeated pattern, which can be described as in the first output cycle, two input cycles compose the positive half, with three input cycles in the negative half;

in the second output cycle, three input cycles compose the positive half, with two input cycles in the negative half.

The pattern then repeats. Phase control is provided to manipulate the output voltage as before.

Figure 5B:
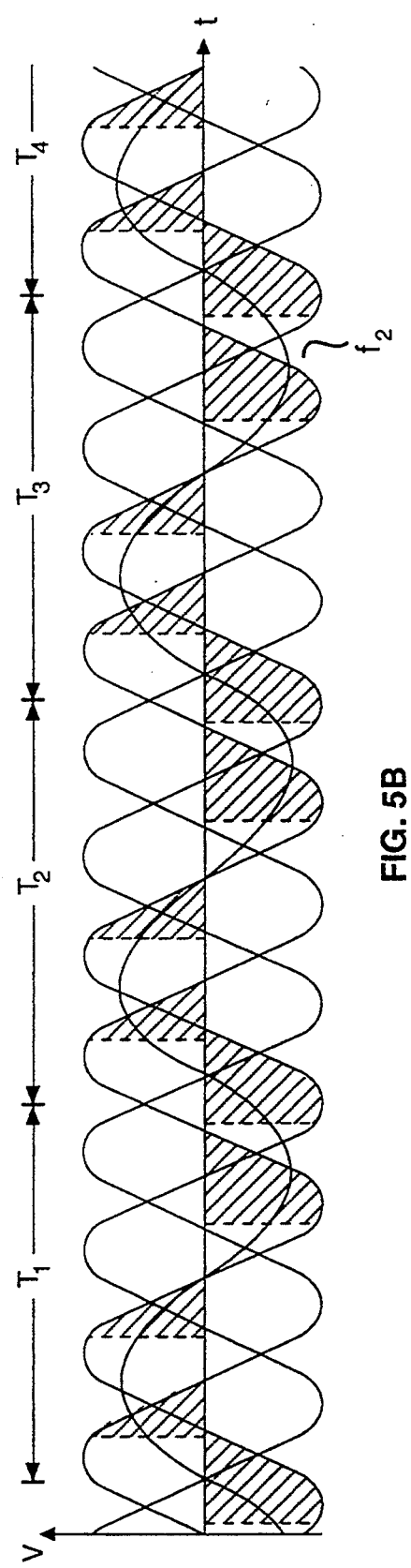

FIG. 5B illustrates another strategy where phase control allows the generated output waveform to be independant of zero-crossings of the particular input phases from which it is synthesized. Three complete output cycles, $T_n$, can be identified. The phase control also allows the output voltage to be regulated.

It will be appreciated a large number of intermediate steps can be achieved between $f_0$ and $f_1$. It is preferable that each increase in frequency in mode 2 occurs at integral fractions of cycles. Again, a degree of voltage control by manipulation of the firing of the SCRs is desirable.

Figure 6A:
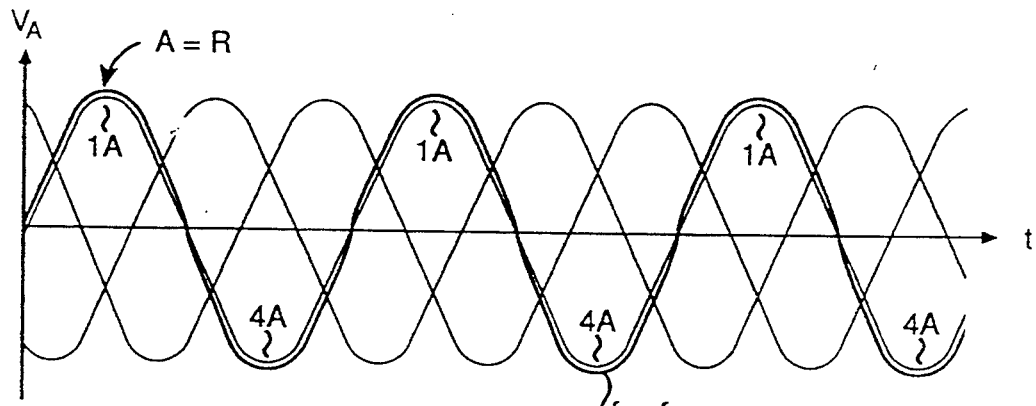
FIG. 6 shows a third mode of operation of a variable speed AC controller referenced in FIG. 3.
Figure 6B:
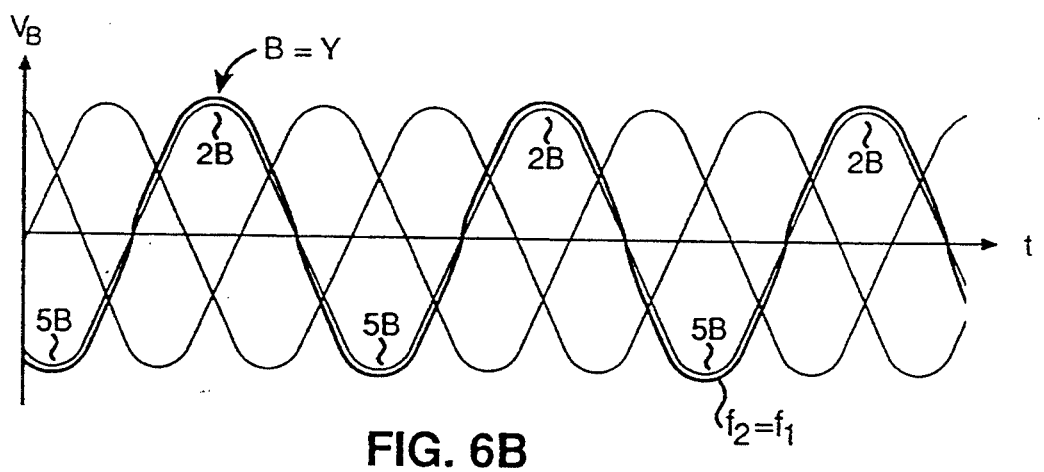
Figure 6C:
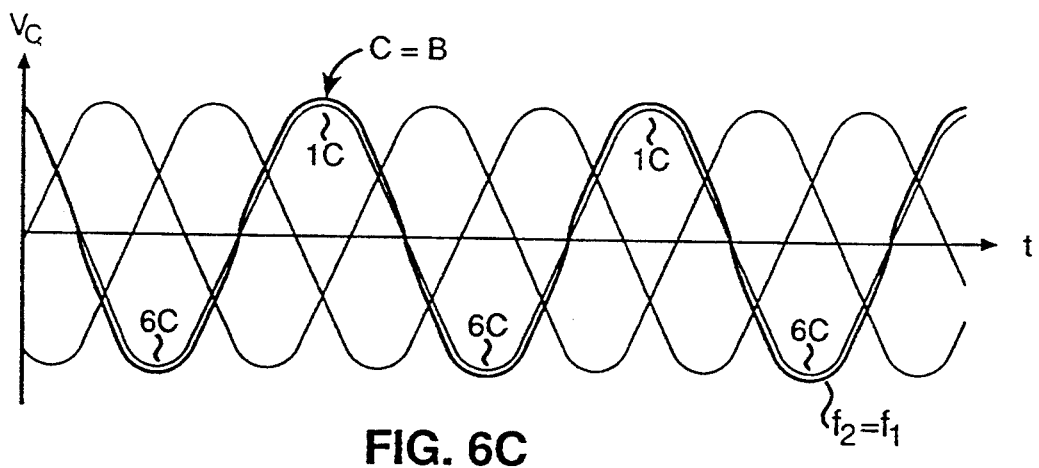

FIGS. 6A–6C show the respective output phase waveforms having fundamental frequency of $f_2=f_1$ which correspond to mode 3 operation. The induction machine 12 is provided with the mains frequency $f_1$ as its input frequency, and therefore is required to operate at full speed. In effect, only two SCRs in each of the phase power circuits 14–18 are being used, and these can be gated on at the necessary instances, there being natural line commutation between the respective positive and negative half cycles. In this mode, the cycloconverter 10 is effectively transparent to the AC machine 12, which believes it is connected directly to the input supply R,Y,B. The example of FIG. 6A relates to phase A, and it can be seen that SCRs 1A and 4A are the only ones which are placed in their conducting state. The remaining SCRs are blocked at all times.

In mode 3, the frequency provided to the induction motor 12 is equal to the mains frequency as discussed, however the rotational speed achieved by the induction machine 12 may well be slightly above or slightly below the nominal top speed, depending upon the out of balance forces associated with the lift car and its counterweight. That is, a fully loaded lift car travelling down is likely to overshoot its top speed whereas a loaded lift car travelling upwards may undershoot the nominal top speed.

Speed regulation by feedback or by phase control is not necessary as was the case in mode 1, which has the advantage of increasing efficiency and reducing machine heating due to losses flowing from chopping the input supply by such phase control.

Figure 7:
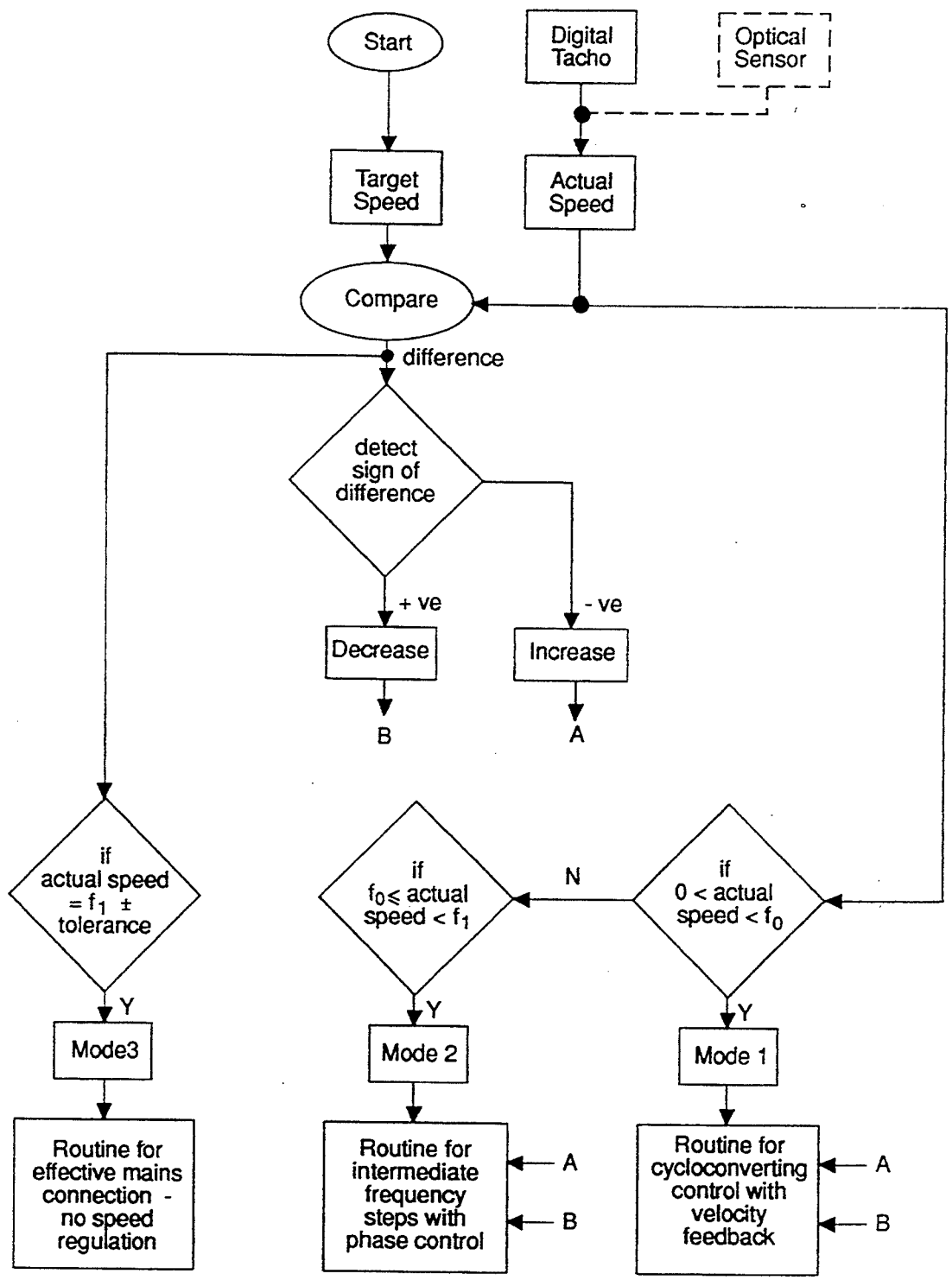
FIG. 7 shows a flow diagram illustrating the sequence implemented to achieve speed control.

The flow diagram shown in FIG. 7 is intended to illustrate the steps implemented in software residing in the microprocessor 25 and the memory 23 which effectively controls the firing electronics 22 and the reference generating electronics 24.

It is believed the flow diagram is self explanatory, especially when viewed in the context of the following description.

As indicated earlier, the operation of the control system is independent of whether the induction machine 12 is accelerating or decelerating. Therefore, in the normal operation of a lift car travelling from the stopped position at one floor to the stopped position at another floor, the interchange between the three modes as shown in FIG. 2.

From time=0, the control system operates in mode 1 as the lift car accelerates. When the lift car approaches the speed corresponding to frequency $f_0$, the control system switches to mode 2 operation. Mode 2 operation contains a number of intermediate frequency steps which the induction machine 12 approaches in terms of rotational speed before the next highest target frequency is selected by the controller. Once the induction machine 12 has approached the last of these intermediate frequencies $f_1$, mode 3 is entered, whereby the output frequency from the cycloconverter 10 is selected to be the mains frequency. The induction machine 12 will then approach or overshoot the top speed corresponding to the supply frequency, and proceed at this speed until such time as the lift car is to decelerate into the destination floor. The process performed during the acceleration period is then repeated but in reverse. From mode 3, the control system enters mode 2, and the speed of the induction machine 12 decreases towards each of the intermediate frequencies provided for in mode 2 to the point where mode 1 is entered, that being normal cycloconverting mode. A form of machine braking is achieved in mode 2 during deceleration. By injecting a freqeuncy lower than the actual rotational speed a braking effect occurs, which is similar in some respects to DC braking, although it creates far less machine heating and allows regneration in the supplies R,Y,B of the braking energy.

Once the speed of the inductor machine 12 has reached the uppermost bound of mode 1, the speed is further reduced by cycloconverting frequency control utilizing speed feedback to bring the lift car to a stop at the destination floor.

I claim:

1. A method of controlling the speed of a rotating AC machine, the AC machine being connected to a frequency converter which includes a plurality of switching elements connected to respective phases of a multi-phase input power supply and a control for selectively switching the switching elements, the method comprising:

operating the AC machine in three exclusive speed ranges within the range 0 to the frequency of the input supply, $f_1$, wherein each of the three speed ranges corresponds to a separate operating mode of the frequency converter, and (i) in the first mode, synthesizing a near continuum of frequencies in the range 0 to $f_0$, where $f_0$ is less than $f_1$ by switching said switching elements to synthesize the near continuum of frequencies from the multi-phase input power supply, (ii) in the second mode, synthesizing a number of output waveforms of intermediate frequency steps between the frequencies $f_0$ to $f_1$ by switching said switching elements to synthesize the intermediate frequency steps from the multi-phase input power supply, and between each frequency step, adjusting the phase of the input supply to obtain voltage control over the AC machine, and (iii) in the third mode, connecting said switching elements so that the AC machine is effectively connected directly to said multi-phase input power supply, whereby the AC machine receives the input supply frequency $f_1$.

2. The method of claim 1, wherein in the first mode the frequency converter operates as a cycloconverter.

3. The method of claim 1 wherein, in operation of the second mode, each half-cycle of each output waveform from the frequency converter is generated by the respective resultant of a half cycle of one input phase and one or more subsequent half cycles of the same polarity from the next input phases in time.

4. The method of claim 3 wherein, in developing the said resultant, the change from one half cycle to another half cycle of the same polarity of a subsequent input phase in time occurs when the absolute magnitude of the waveform of the next half cycle is greater than that of the present half cycle.

5. The method of claim 1 wherein said AC machine has at least two phase supply terminals, said input power supply having multiple input phase terminals, said frequency converter providing a unique switchable path between each input phase terminal of said input power supply to each phase terminal of the A.C. machine.

6. A method of operating an AC-AC frequency converter which includes a plurality of switching elements connected to the respective phases of a multi-phase input power supply with frequency, $f_1$, and a control for selectively switching the switching elements to connect the multi-phase input power supply to an output of the frequency converter, comprising:

(i) operating the frequency converter in a first mode within the frequency range 0 to $f_0$, where $f_0$ is less than $f_1$, said step (i) of operating synthesizing a near continuum of frequencies in the said range from said multi-phase input power supply, (ii) operating the frequency converter in a second mode by synthesizing a number of output waveforms of intermediate frequency steps between the frequencies $f_0$ to $f_1$ from the multi-phase input power supply, and between each frequency step providing further control by adjusting the phase of the multi-phase input power supply to obtain control over the output voltage from the frequency converter, and (iii) operating the frequency converter in a third mode by connecting said switching elements so that the output is effectively connected directly to said multi-phase input power supply so as to provide at the at the output of the converter, the input supply frequency, $f_1$.

7. The method of claim 6 wherein in the first mode the frequency converter operates as a cycloconverter.

8. The method of claim 6 wherein output includes at least two output terminals, said input power supply having multiple input phase terminals, said plurality of switching elements providing unique switchable paths between each of said multiple input phase terminals and said at least two output terminals.

9. The method of claim 6 wherein, in operation of the second mode, each half-cycle of each output waveform from the frequency converter is generated by a respective resultant of a half cycle of one input phase and one or more subsequent half cycles of the same polarity from the next input phases in time.

10. The method of claim 9 wherein, in developing the said resultant, the change from one half cycle to another half cycle of the same polarity of a subsequent input phase in time occurs when the absolute magnitude of the waveform of the next half cycle is greater than that of the present half cycle.

11. The method of claim 9 wherein the output includes at least two output terminals, said input power supply having multiple input phase terminals, said AC-AC frequency converter providing a unique switchable path between each of said multiple input phase terminals and said at least two output terminals.

12. A variable speed controller for an AC machine, comprising:

a frequency converter suitable for connection to a multi-phase input power supply and for generating an output which would be provided to the AC machine, the frequency converter including power switching means, and processor means for controlling said frequency converter under control of a program residing therein to operate the frequency converter in three exclusive speed ranges within the range 0 to the frequency of the multi-phase input supply, $f_1$, (i) said processor means controlling said frequency converter in a first mode within the frequency range 0 to $f_0$, where $f_0$ is less than $f_1$, to synthesize a near continuum of frequencies in the said range from said input power supply, (ii) said processor means controlling said frequency converter in a second mode to synthesize a number of output waveforms of intermediate frequency steps between the frequencies $f_0$ to $f_1$ from the multi-phase power supply, and between each frequency step further adjusting the phase of the multi-phase input power supply to obtain control over the output voltage from the frequency converter, and (iii) said processor means controlling said frequency converter in a third mode to connect the output directly to the multi-phase input power supply so that the frequency converter is effectively transparent to the multi-phase input power supply and provides an output of the the frequency converter with the input supply frequency, $f_1$.

13. The variable speed controller of claim 12 wherein said AC machine has at least two phase supply terminals, said input power supply having at least two input phase terminals, said power switching means providing a unique switchable path between each input phase terminal of said input power supply to each phase connection of the A.C. machine.

* * * * *